US009144941B2

(12) United States Patent
Grebe et al.

(10) Patent No.: US 9,144,941 B2
(45) Date of Patent: Sep. 29, 2015

(54) PROCESS FOR THE PRODUCTION OF A THREE DIMENSIONAL SYSTEM

(75) Inventors: Maik Grebe, Bochum (DE); Wolfgang Diekmann, Waltrop (DE); Stefan Altkemper, Dorsten (DE)

(73) Assignee: Evonik Degussa GmbH, Essen (DE)

( * ) Notice: Subject to any disclaimer, the term of this patent is extended or adjusted under 35 U.S.C. 154(b) by 711 days.

(21) Appl. No.: 13/364,458

(22) Filed: Feb. 2, 2012

(65) Prior Publication Data
US 2012/0202012 A1    Aug. 9, 2012

(30) Foreign Application Priority Data

Feb. 3, 2011 (DE) .................. 10 2011 003 610

(51) Int. Cl.
*B29C 35/08* (2006.01)
*B29C 41/02* (2006.01)
*B29C 67/00* (2006.01)
*B22F 3/105* (2006.01)
*B29B 13/00* (2006.01)

(52) U.S. Cl.
CPC .......... *B29C 67/0077* (2013.01); *B22F 3/1055* (2013.01); *B22F 2003/1056* (2013.01); *B29B 13/007* (2013.01); *Y10T 428/24612* (2015.01)

(58) Field of Classification Search
CPC .................. B29C 67/0051; B29C 67/0077
USPC ............. 264/39, 85, 113, 460, 461, 462, 463, 264/497
See application file for complete search history.

(56) References Cited

U.S. PATENT DOCUMENTS

| 5,304,329 | A  | * | 4/1994  | Dickens et al. ............... 264/497 |
| 6,136,948 | A  |   | 10/2000 | Dickens, Jr. et al. |
| 2002/0090313 | A1 | * | 7/2002  | Wang et al. ............... 264/497 X |
| 2004/0232583 | A1 |   | 11/2004 | Monsheimer et al. |
| 2007/0183918 | A1 |   | 8/2007  | Monsheimer et al. |
| 2007/0238056 | A1 |   | 10/2007 | Baumann et al. |
| 2009/0068245 | A1 |   | 3/2009  | Noble et al. |
| 2009/0068376 | A1 | * | 3/2009  | Philippi et al. ............... 427/532 |
| 2010/0090374 | A1 |   | 4/2010  | Dietrich et al. |
| 2011/0252618 | A1 |   | 10/2011 | Diekmann et al. |
| 2011/0291331 | A1 |   | 12/2011 | Scott |

FOREIGN PATENT DOCUMENTS

| DE | 10356193 | 12/2003 |
| DE | 10 2005 014 483 A1 | 10/2006 |
| EP | 1737646 | 1/2007 |
| WO | WO 96/06881 | 3/1996 |
| WO | WO 98/51464 | 11/1998 |
| WO | WO 01/38061 A1 | 5/2001 |

(Continued)

OTHER PUBLICATIONS

U.S. Appl. No. 13/658,325, filed Oct. 23, 2012, Grebe, et al.

(Continued)

*Primary Examiner* — Leo B Tentoni
(74) *Attorney, Agent, or Firm* — Oblon, McClelland, Maier & Neustadt, L.L.P.

(57) ABSTRACT

A process for the layer-by-layer production of three-dimensional objects, through selective melting and solidification of pulverulent substrates is provided. According to the process the construction chamber is inertized with an inertizing gas which is of higher density than air. An apparatus for conducting the process is also provided.

11 Claims, 4 Drawing Sheets

(56) References Cited

FOREIGN PATENT DOCUMENTS

| WO | WO 2005/090055 A1 | 9/2005 |
| WO | WO 2005/105412 A1 | 11/2005 |
| WO | WO 2009/014718 A1 | 1/2009 |
| WO | WO 2010/007394 A1 | 1/2010 |

OTHER PUBLICATIONS

European Search Report Issued Jun. 6, 2012 in Patent Application No. 12150697.6 with English Translation of Category of Cited Documents.

* cited by examiner

PROCESS FOR THE PRODUCTION OF A THREE DIMENSIONAL SYSTEM

CROSS REFERENCE TO RELATED APPLICATIONS

This application claims priority to German Patent Application No. 102011003610.5, filed Feb. 3, 2011, the enclosure of which is incorporated herein in its entirety by reference.

BACKGROUND OF THE INVENTION

The rapid provision of prototypes is a task frequently encountered in very recent times. Processes which permit the rapid provision of a prototypes are described as rapid prototyping, rapid manufacturing, or as an additive fabrication process. Particularly suitable processes the rapid provision of a prototype are based on selective melting and solidification of pulverulent materials which are produced in a layer-by-layer manner through selective melting and solidification of the pulverulent material according to a pattern of the prototype object under construction. Supportive structures for overhangs and undercuts are not required in such a process, because the powder bed surrounding the molten regions provides adequate support. Correspondingly, as no supports are employed, a subsequent task of removing supports is not required. These processes are also suitable for short-run production. The temperature of the construction chamber is selected in such a way as to avoid distortion of the structures produced layer-by-layer during the construction process.

The selectivity of the layer-by-layer process may be achieved by way of example by applying susceptors, absorbers, or inhibitors, or through masks, or by way of focussed introduction of energy, for example through a laser beam, or by way of electromagnetic radiation introduced through glass fibres.

One process which has particularly good suitability for rapid prototyping/rapid manufacturing is selective laser sintering (SLS). In this process, plastics powders in a chamber are selectively briefly exposed to a laser beam, and the powder particles impacted by the laser beam therefore melt. The molten particles coalesce and rapidly solidify again to give a solid mass. This process can produce three-dimensional structures simply and rapidly by constantly applying new layers and repeatedly exposing them to laser light to melt and subsequently coalesce in the form of the three dimensional object.

The laser sintering (rapid prototyping) process for producing mouldings from pulverulent polymers is described in detail in the U.S. Pat. No. 6,136,948 and WO 96/06881 (both DTM Corporation). A wide variety of polymers and copolymers is claimed for this application, and includes polyacetate, polypropylene, polyethylene, ionomers and polyamide, for example.

Other processes having good suitability are the SIV process, as described in WO 01/38061, and a process as described in EP 1015214. Both processes operate with area infrared heating to melt the powder. The selectivity of the melting process is achieved in the first process through application of an inhibitor, and in the second process through a mask. DE10356193 describes another process. In this, the energy needed for the fusion process is introduced through a microwave generator, and the selectivity is achieved by applying a susceptor.

Other processes use an absorber, which is either present within the powder or is applied by ink-jet processes, as described in EP1737646.

The rapid prototyping or rapid manufacturing processes described (RP processes or RM processes) can use pulverulent substrates, in particular polymers, preferably selected from polyesters, polyvinyl chloride, polyacetals, polypropylene, polyethylene, polystyrene, polycarbonate, poly(N-methylmethacrylimides) (PMMI), polymethyl methacrylate (PMMA), ionomer, polyamides, or a mixture thereof.

The processing of polymer powders often requires an elevated construction chamber temperature, in order to avoid problems of shrinkage and of distortion. This required construction chamber temperature is also identified as the processing temperature and depends on the polymer powder to be processed. Generally, the processing temperature is slightly below the melting point of the material to be processed. A problem associated with such processes is the adverse effect of atmospheric oxygen at the high temperatures during processing lead to degradation of the polymer being processed. For this reason, an inert gas is generally used to inertize the construction chamber during processing. For example, nitrogen is used to flush the construction chamber continuously during the entire process. Continuous flushing is necessary because the inert gas escapes from the construction chamber through leaks in the apparatus. If nitrogen is provided through a generator, the necessary purity cannot be ensured, and residual oxygen content is therefore still too high. On the other hand, it is expensive to flush the construction chamber with nitrogen of appropriate purity. The fields of application for components from the processes mentioned are constantly expanding, and the requirements placed upon the properties of the components are therefore also becoming more stringent. Many future requirements will therefore be achievable only with materials of higher melting point than materials used hitherto. The higher processing temperatures associated therewith then require better inertization, since the adverse effect of oxygen during processing usually increases as temperatures rise.

In conventional systems of this type, the inert gas is introduced by way of the lens and the pyrometer, so that deposition of material on lens and pyrometer is inhibited. At the same time, the inert gas cools the lens and the pyrometer. In order to achieve an appropriate cooling effect, the temperature of the inert gas must be markedly lower than the temperature of the construction chamber. However, this has the disadvantage that the cool inert gas has a marked cooling effect on the construction chamber and in particular on the powder in the construction space. This disrupts the construction process, since additional control of the temperature has to be undertaken in order to avoid distortion effects. The cool inert gas moreover produces an increased level of turbulence in the construction chamber.

BRIEF SUMMARY OF THE INVENTION

In view of the above problems, it is an object of the present invention to provide a simplified process which can produce three-dimensional objects, where the throughput of inert gas can be reduced without disrupting the conduct of the construction process per se or reducing the quality of the resultant components.

This and other objects have been achieved by the present invention, the first embodiment of which includes a process for the production of a three-dimensional object, comprising: inertizing the construction chamber by admission of an inertizing gas or inertizing gas mixture which is unreactive with process components under process conditions; wherein the density of the inertizing gas or inertizing gas mixture is higher than the density of air, and the production process comprises a layer-by-layer method.

In a second embodiment, the layer-by-layer method comprises: supplying a first layer of pulverulent material to a support of a construction chamber; inertizing the construction chamber; selectively melting the pulverulant material according to a pattern for the three-dimensional object; allowing the molten pulverulant material to solidify in the pattern of the three-dimensional object; adding a further layer of pulverulent material to the first layer containing the solidified material of the pattern; inertizing the construction chamber; selectively melting the further added layer of pulverulent material in the pattern of the three dimensional object; allowing the molten pulverulant material to solidify onto the solidified material; and continuing the addition of pulverulant material, inertizing, selective melting and solidification according to the pattern of the three dimensional object until a three dimensional object of the pattern is obtained; wherein the inertizing of the construction chamber comprises adding an unreactive gas or unreactive gas mixture with density higher than that of air to the construction chamber.

DETAILED DESCRIPTION OF THE INVENTION

Figure 1:
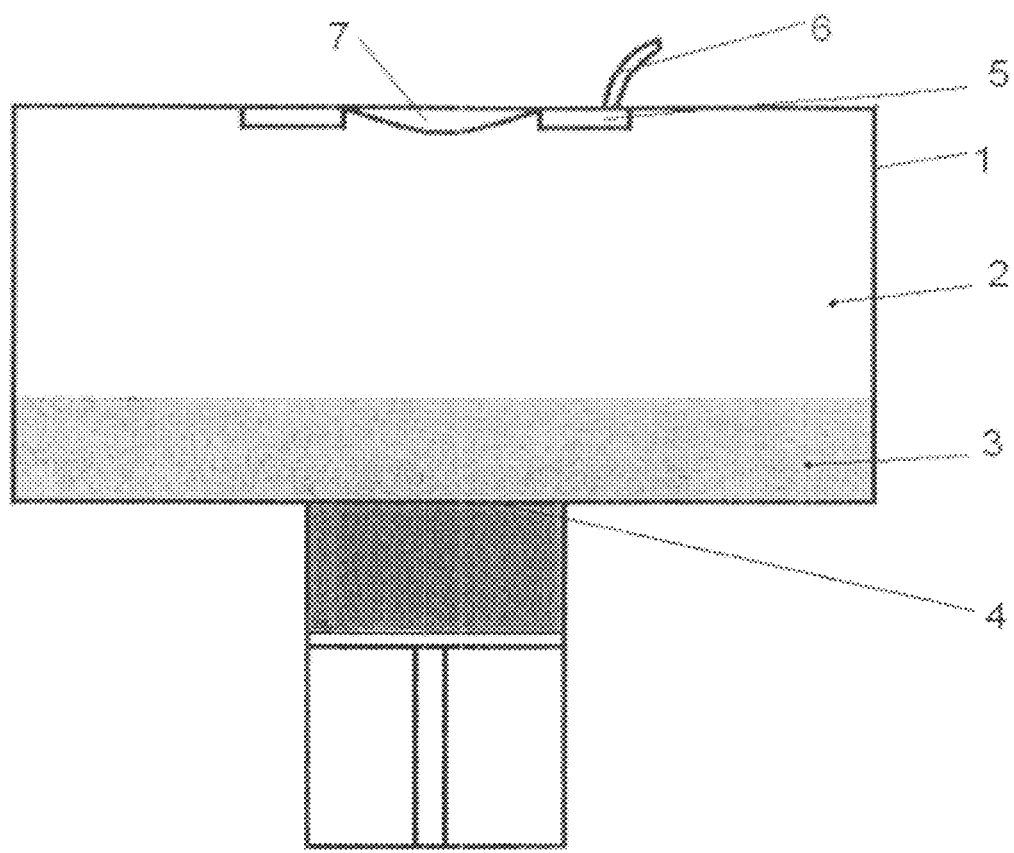
FIG. 1 shows the inertization of a construction chamber of a SLS apparatus according to one embodiment of the invention.

Surprisingly, markedly improved inertization may be achieved through flushing of the construction chamber with an inert gas which is heavier than air. Moreover, the amount of inert gas needed to achieve good inertization is markedly smaller than conventionally employed. Accordingly, the present invention firstly provides a process for the layer-by-layer production of three-dimensional objects where an unreactive gas or gas mixture with density higher than that of air is used to inertize the construction chamber.

For the purposes of the present invention, air is the gas mixture of the earth's atmosphere. For the purposes of the present invention, inertizing gases are any of the gases which, under the conditions of the process, do not react with the pulverulent substrates used. For the purposes of the present invention, gases or gas mixtures considered to be heavier than air are any of those of which the density under standard conditions is greater than that of air (the density of air being 1.293 kg/m$^3$ under standard conditions (DIN 1343: temperature 273.15 K and pressure 1.01325 bar). Suitable inertizing gases are in particular noble gases or noble gas compounds which are heavier than air, e.g. argon, krypton, xenon or xenon hexafluoride. However, other heavy unreactive gases such as, for example, carbon dioxide, may also be suitable as inertizing gases. Inertizing gases comprising at least one of argon, krypton, xenon, xenon hexafluoride and carbon dioxide are particularly preferred.

In principle, any of the pulverulent substrates known to the person skilled in the art may be utilized in the processes of the invention. Particularly suitable materials may be thermoplastics and thermoelastic materials, examples being polyethylene (PE, HDPE, LDPE), polypropylene (PP), polyamides, polyesters, polyesteresters, polyetheresters, polyphenylene ethers, polyacetals, polyalkylene terephthalates, in particular polyethylene terephthalate (PET) and polybutylene terephthalate (PBT), polymethyl methacrylate (PMMA), polyvinyl acetal, polyvinyl chloride (PVC), polyphenylene oxide (PPO), polyoxymethylene (POM), polystyrene (PS), acrylonitrile-butadiene-styrene (ABS), polycarbonates (PC), polyether sulphones, thermoplastic polyurethanes (TPU), ionomers, polyaryl ether ketones, in particular polyether ether ketone (PEEK), polyether ketone ketone (PEKK), polyether ketone (PEK), polyether ether ketone ketone (PEEKK), polyaryl ether ether ether ketone (PEEEK) or polyether ketone ether ketone ketone (PEKEKK), polyetherimides (PEI), polyarylene sulphides, in particular polyphenylene sulphide (PPS), thermoplastic polyimides (PI), polyamide-imides (PAI), polyvinylidene fluorides, and also copolymers of the said thermoplastics, e.g. a polyaryl ether ketone (PAEK)/polyaryl ether sulphone (PAES) copolymer, mixtures and/or polymer blends. Ionomers are thermoplastics which may be obtained through copolymerization of a non-polar monomer with a polar monomer. They are marketed by way of example with trade name Nafion (DuPont). The polar bonds suppress crystallization and lead to "ionic crosslinking". An advantage of ionomers over conventional thermoplastics is that they comprise not only effective secondary valence forces but also effective ionic bonds. The said ionic bonds are particularly strong and give the substance its characteristic properties.

In a particularly preferred embodiment of the invention, the polymer powder comprises at least one polyamide or polyether ketone, in particular nylon-12, nylon-6 or nylon-6,6, or PEEK, particular preference being given here to the polyamides mentioned.

FIG. 1 shows the principle of improved inertization of the construction chamber (1) of an SLS machine. An advantage of this embodiment is the use of argon (3) as inertizing gas, which is heavier than air and which thus occupies the space directly above the powder surface (4) and displaces lighter air constituents (2) such as oxygen. The amount of inertizing gas needed to ensure adequate protection of the powder material to be processed is therefore markedly smaller. It is advantageous if the inertizing gas is also utilized to free the lens of the laser optics from deposits. If the inertizing gas (6) is injected by way of an appropriately shaped nozzle (5) by way of the lens it is possible to reduce the extent of deposits on the lens (7). A similar principle may also be used to avoid deposits on the lens of the pyrometer. Use of some polymer materials leads to preferential deposition of volatile constituents at the coldest locations within the construction chamber, and it is therefore advantageous to heat the inertizing gas to the temperature level of the construction chamber. The construction chamber temperature needed for some materials can be within a high temperature range that has adverse effects on the lens. In this case, the flushing of the lens with an inertizing gas can also be used for the cooling process. In this case, a correspondingly lower temperature has to be set for the inertizing gas. Correspondingly, in this special embodiment, the inertizing gas (6) may be different from the inertizing gas (3) and may have a density less than the density of air.

The inertization process may be further improved by not only inertizing the pulverulent powder in the construction chamber but also inertizing the powder in the feed containers.

Accordingly, therefore, an inertizing gas or inertizing gas mixture may also be used to inertize the pulverulent substrates used in the feed containers. Prolonged flushing with an inertizing gas may be necessary in order to eliminate the oxygen from the pulverulent powder materials, and to the extent that the pulverulent powder is porous, from the pores of the powder. This inhibits concomitant introduction, into the construction chamber, of the oxygen adhering to the porous materials. In this embodiment, a nitrogen-containing gas mixture may be used to inertize the feed container.

Figure 2:
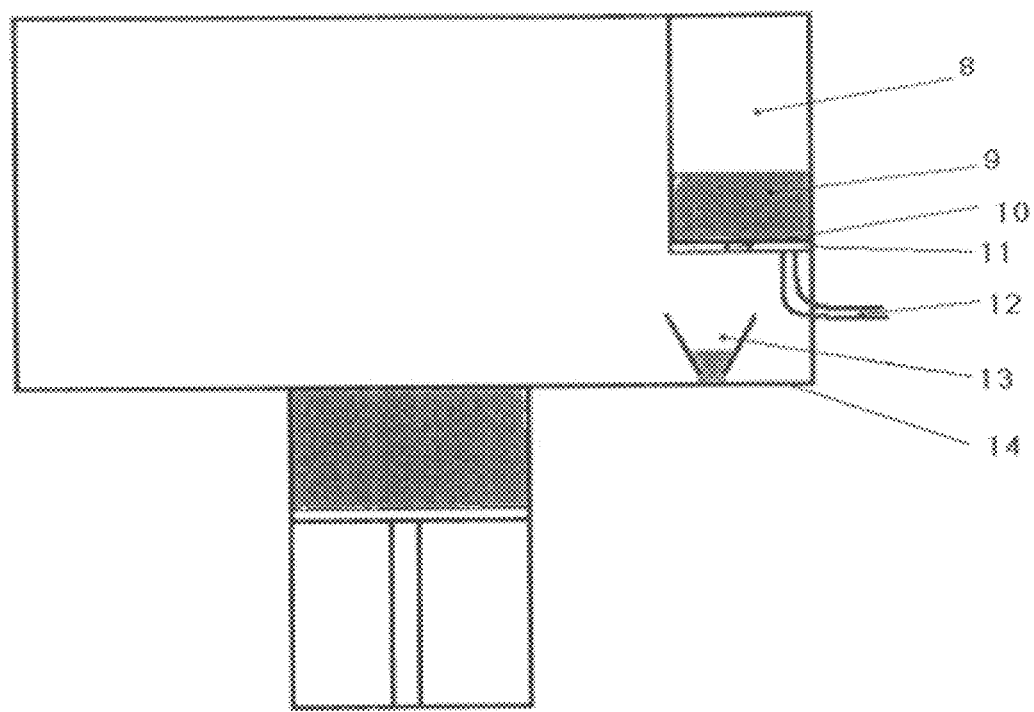
FIG. 2 shows an embodiment of the invention wherein an inert gas flows through a feed chamber below the construction chamber.

In an embodiment of the present invention shown in FIG. 2, an inertizing gas (12) flows from below through the feed container (8) situated above the construction level (14). By using a sieve plate (11) it may be possible to fluidize the powder (9) above the sieve plate by flow of the inertizing gas. This permits particularly uniform flow of the inertizing gas through the powder, thus ensuring that atmospheric oxygen may be removed from the powder bed. The sieve plate may be combined with a metering device (10) through which material is then charged to the recoater (13). In this particular embodiment, nitrogen may be used as the inertizing gas (12).

Figure 3:
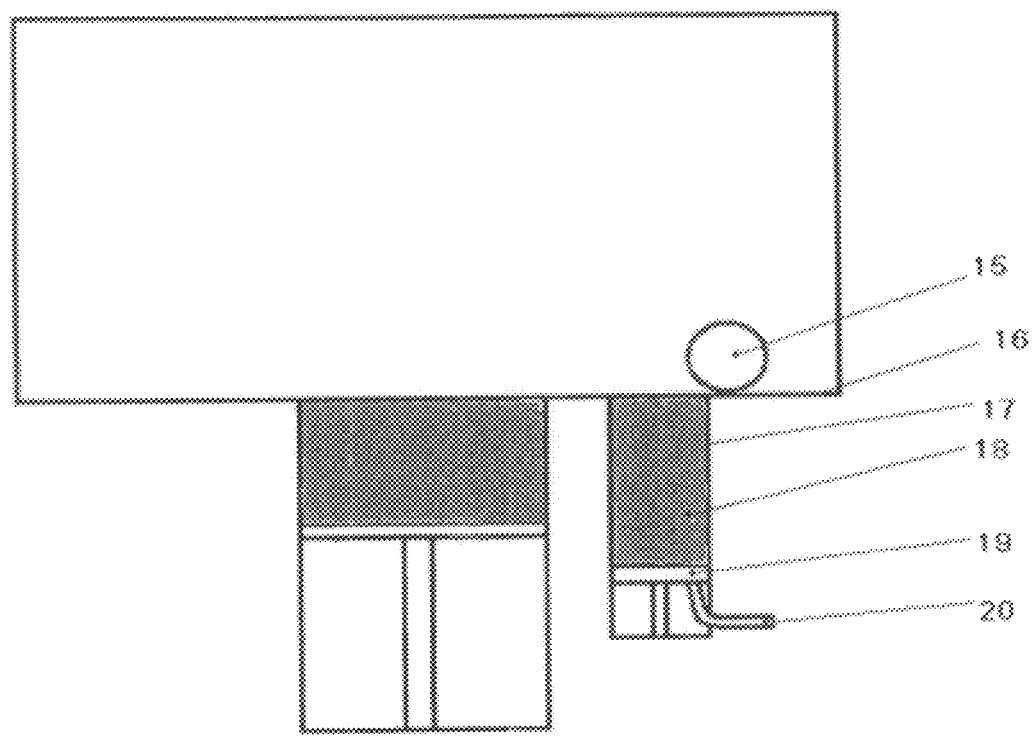
FIG. 3 shows another embodiment of the invention wherein an inert gas flows through a feed chamber below the construction chamber.

In another embodiment shown in FIG. 3, an inertizing gas (20) flows from below through the feed container (17) situated under the construction level (16). Here again, by using a sieve plate (19) it may be possible to provide particularly uniform introduction of the inertizing gas into the powder (18). A recoater (15) may then be used to apply the powder thus freed from atmospheric oxygen.

Figure 4:
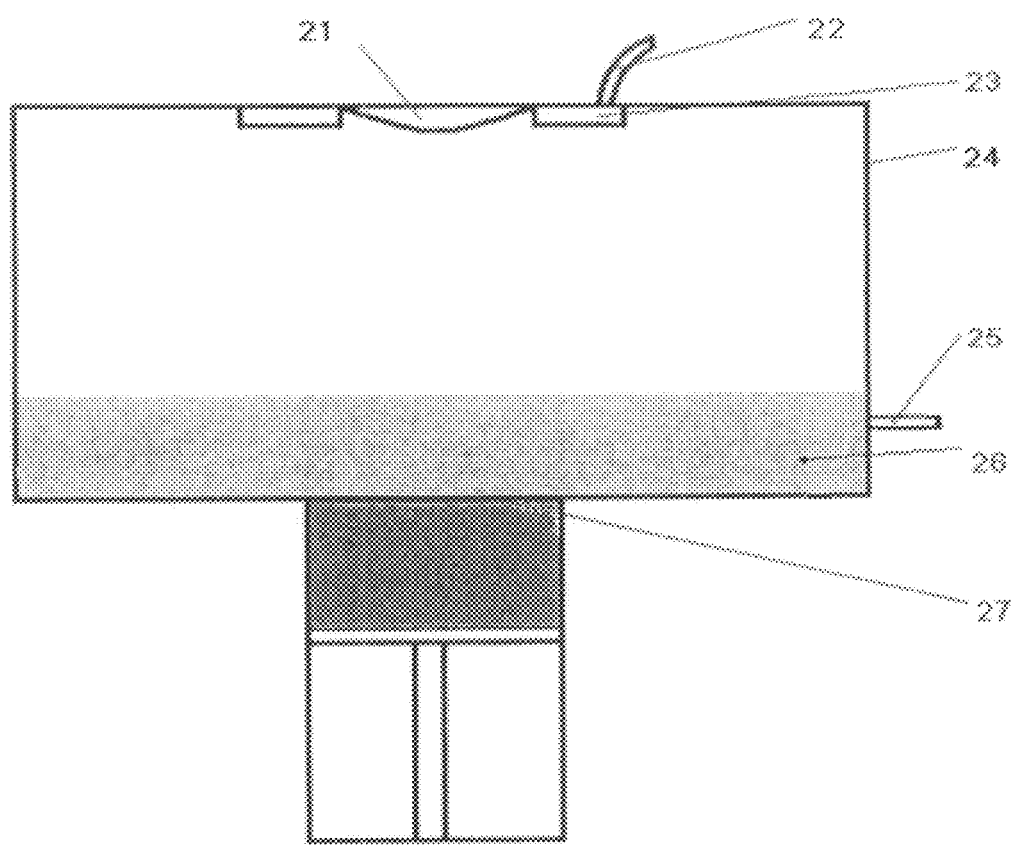
FIG. 4 shows an embodiment of the invention wherein separately from the inertization of the construction chamber, an inert gas is used to flush the lens and pyrometer.

An embodiment shown in FIG. 4 moreover solves the problem of the disruptive effect of the cold inert gas which arises when the material processed requires a high construction chamber temperature and cooling of lens and pyrometer is necessary. In this embodiment of the process of the invention, an inertizing gas or inertizing gas mixture may also be used to flush, and therefore cool, the lens and pyrometer, separately from the inertization of the construction chamber. The construction chamber (24) here is inertized by gases introduced separately. The temperature at which the inertizing gas (25) is passed into the construction chamber is close to the construction chamber temperature, which may usually be only slightly below the melting point of the material to be processed. The said construction chamber temperature may be in the range from 60 to 400° C., in particular from 120 to 330° C. and very particularly preferably in the range from 160 to 220° C. The temperature of the inertizing gas passed into the construction chamber is preferably at most 30° C., in particular at most 20° C. and very particularly preferably at most 10° C. below the process temperature. The lower region of the construction chamber (26) is thus inertized while at the same time avoiding any major cooling of the powder surface (27). The inert gas (22), which is markedly cooler, is introduced by way of a nozzle (23), in order to cool lens (21) and pyrometer. In one particularly advantageous embodiment, an inert gas with a density lower than that of air, for example a nitrogen-containing gas mixture, is utilized for the flushing, or else cooling, of lens and pyrometer, and at the same time an inert gas with maximum possible density, for example argon, is selected for the inertization of the powder surface. If construction temperature is very high, it can be necessary to use an even denser inert gas, e.g. xenon, for the lower region of the construction chamber, in order to prevent the colder inertizing gas used for lens cooling from reaching the powder surface and cooling the powder material there.

Good sealing of the construction chamber may be advantageous in all embodiments, since less loss of inertizing gas to the environment also reduces inertizing gas consumption. The person skilled in the art is well aware of measures for the appropriate sealing of the construction chamber, and these may be used in any desired manner. A pressure-relief valve may be used to avoid excessive gauge pressure. When an inertizing gas is used which is heavier than air, the position selected for the pressure-relief valve should be markedly above the construction level.

The present invention further provides apparatuses for the layer-by-layer production of three-dimensional objects, at least comprising a construction chamber and, attached thereto, a passage for inertizing gas or inertizing gas mixtures, the density of which is higher than that of air, for conduct of the process of the invention. Appropriate embodiments of apparatuses of the present invention may be found in the figures. However, these embodiments are provided herein for purposes of illustration and are not intended to be limiting.

The apparatus of the present invention generally has a construction chamber with a construction platform of which the height is adjustable, an apparatus for applying, onto the construction platform, a layer of a material which can be solidified through exposure to electromagnetic radiation, an irradiation device comprising a radiation source emitting electromagnetic radiation, a control unit and a lens situated in the beam path of the electromagnetic radiation, for the irradiation of sites within the layer which correspond to the object.

The present invention further provides three-dimensional objects produced by a process according to the present invention.

Numerous modifications and variations on the present invention are possible in light of the above teachings. It is therefore to be understood that within the scope of the appended claims, the invention may be practiced otherwise than as specifically described herein.

The invention claimed is:

1. A process for production of three dimensional objects in a construction chamber, comprising:
   inertizing the construction chamber by admission of an inertizing gas or inertizing gas mixture which is unreactive with process components under process conditions; wherein
   a density of the inertizing gas or inertizing gas mixture is higher than the density of air, and
   the production process comprises a layer-by-layer method, comprising:
   supplying a first layer of a pulverulent material to the construction platform of a construction chamber;
   inertizing the construction chamber with the inertizing gas or inertizing gas mixture;
   selectively melting the pulverulant material according to a pattern for the three-dimensional object;
   allowing the molten pulverulant material to solidify in the pattern of the three-dimensional object;
   adding a further layer of a pulverulent material to the first layer containing the solidified material of the pattern;
   inertizing the construction chamber with the inertizing gas or inertizing gas mixture;
   selectively melting the further added layer of a pulverulant material in the pattern of the three dimensional object;
   allowing the molten pulverulant material to solidify onto the solidified material; and
   continuing the addition of the pulverulant material, inertizing the construction chamber, selective melting and solidification according to the pattern of the three dimensional object until a three dimensional object of the pattern is obtained;

the production process further comprising:
inertizing the pulverulent material in a feed container prior to supply to the construction chamber.

2. The process according to claim 1, wherein the inertizing gas or inertizing gas mixture comprises a noble gas or a mixture of noble gases.

3. The process according to claim 1, wherein the inertizing gas is at least one selected from the group consisting of argon, krypton, xenon, xenon hexafluoride and carbon dioxide.

4. The process according to claim 1, wherein
the pulverulent material in the feed container is inertized with a gas mixture which comprises nitrogen.

5. The process according to claim 1, wherein
a temperature of the inertizing gas or inertizing gas mixture is controlled to a temperature at a level of a temperature of the construction chamber.

6. The process according to claim 1, further comprising flushing a lens and a pyrometer of the construction chamber with an inertizing gas or inertizing gas mixture; wherein the flushing of the lens and pyrometer is separate from the inertization of the construction chamber.

7. The process according to claim 6, wherein a density of the inertizing gas or inertizing gas mixture for flushing the lens and pyrometer is lower than the density of air.

8. The process according to claim 6, wherein
the inertizing gas flushing the lens and pyrometer comprises nitrogen, and
the inertizing gas of the lower region of the construction chamber over the pulverulent powder is argon or xenon.

9. The process according to claim 1, wherein the pulverulent powder comprises at least one material selected from the group consisting of polyethylene, polypropylene, a polyamide, a polyester, a polyesterester, a polyetherester, a polyphenylene ether, a polyacetal and a polyalkylene terephthalate.

10. The process according to claim 9, wherein the pulverulent material is a polyamide, which is selected from the group consisting of nylon-12, nylon-6 and nylon-6,6.

11. The process according to claim 1, further comprising preheating the inertizing gas or inertizing gas mixture to a temperature of at most, 30° C. below a process temperature of the construction chamber.

* * * * *